(12) United States Patent
Gale et al.

(10) Patent No.: US 7,765,322 B2
(45) Date of Patent: Jul. 27, 2010

(54) SYSTEM FOR EXECUTING A MULTIMEDIA RESOURCE

(75) Inventors: Martin J. Gale, Eastleigh (GB); Ian Hughes, Southampton (GB)

(73) Assignee: International Business Machines, Corporation, Armonk, NY (US)

( * ) Notice: Subject to any disclaimer, the term of this patent is extended or adjusted under 35 U.S.C. 154(b) by 964 days.

(21) Appl. No.: 11/195,065

(22) Filed: Aug. 2, 2005

(65) Prior Publication Data

US 2006/0077992 A1 Apr. 13, 2006

(30) Foreign Application Priority Data

Sep. 11, 2004 (GB) .................................. 0420244.6

(51) Int. Cl.
 *G06F 15/173* (2006.01)
(52) U.S. Cl. ..................... 709/240; 709/218; 370/408
(58) Field of Classification Search ................ 709/240, 709/218; 370/408
 See application file for complete search history.

(56) References Cited

U.S. PATENT DOCUMENTS 6,529,950 B1 * 3/2003 Lumelsky et al. ........... 709/218
7,383,504 B1 * 6/2008 Divakaran et al. .......... 345/440

* cited by examiner

*Primary Examiner*—Kyung Hye Shin
(74) *Attorney, Agent, or Firm*—Steven L. Nichols; Vancott, Bagley, Cornwall & McCarthy

(57) ABSTRACT

A system for executing a multimedia resource, for use in an environment having a first multimedia resource comprising an associated first tag, a set of multimedia resources comprising an associated set of tags, an executing component for executing the first multimedia resource. The system comprises a comparator, responsive to the first multimedia resource being executed, for comparing a second tag of the set of tags with the first tag, to determine whether a second multimedia resource is compatible with the first multimedia resource; a determining component, responsive to the second resource being compatible with the first resource, for determining in accordance with at least one rule, whether the second multimedia resource has a higher priority than the first multimedia resource; and a control component, responsive to a determination that the second multimedia resource has the higher priority, for controlling the executing component to execute the second multimedia resource.

27 Claims, 2 Drawing Sheets

SYSTEM FOR EXECUTING A MULTIMEDIA RESOURCE

FIELD OF THE INVENTION

The present invention relates to a system, method, and computer program for executing a multimedia resource.

BACKGROUND OF THE INVENTION

Multimedia content, namely, the combination of text, animated graphics, video, and sound, presents information in a way that is more interesting and easier to grasp than text alone. Multimedia content has been used for education at all levels, job training, and games by the entertainment industry. Multimedia content is becoming more readily available as the price of personal computers and their accessories declines.

Multimedia systems need a delivery mechanism to get the multimedia content to a user. Magnetic and optical disks were the first media for distribution. The Internet, as well as the Transmission Control Protocol/Internet Protocol (TCP/IP) protocol suite or Net BIOS on isolated or campus LANs, became the next vehicles for distribution. The rich text and graphics capabilities of the World Wide Web browsers are being augmented with animations, video, and sound. Internet distribution is being augmented by distribution via satellite, wireless, and cable systems.

Multimedia content files can often be accessed via more than one accessing system. For example, an audio file can be accessed via a CD player, a DVD player, an mp3 player, and the like. Furthermore, an accessing system can access more than one type of multimedia content file. For example, a media player such as Windows media player (Microsoft, Windows, Windows NT, and the Windows logo are trademarks of Microsoft Corporation in the United States, other countries, or both) can access audio files, video files, digital broadcast signals, and the like.

Due to the vast amount of multimedia content files and accessing systems that exist today, the user is faced with a diverse and large choice of multimedia content files and accessing systems to execute. For example, if the user has a multimedia content file to execute and chooses a first accessing system to access it, there may be a second, more appropriate (e.g. cheaper to run or better quality output) accessing system that the user is unaware of, that can also access the multimedia content file. Thus, in this example, the user has not chosen the most appropriate accessing system; therefore, the multimedia content file has not been accessed optimally. This problem increases as the number of options of multimedia content files and/or accessing systems increase.

DISCLOSURE OF THE INVENTION

According to a first aspect, there is provided a system for executing a multimedia resource, for use in an environment having a first multimedia resource comprising an associated first tag, a set of multimedia resources comprising an associated set of tags, and an executing component for executing the first multimedia resource. The system comprises a comparator, responsive to the first multimedia resource being executed, for comparing a second tag of the set of tags with the first tag, in order to determine whether a second multimedia resource is compatible with the first multimedia resource, a determining component, responsive to the second resource being compatible with the first resource, for determining in accordance with at least one rule, whether the second multimedia resource has a higher priority than the first multimedia resource; and a control component, responsive to a determination that the second multimedia resource has the higher priority, for controlling the executing component to execute the second multimedia resource.

Preferably, the first tag and the set of tags comprise data associated with the first multimedia resource and data associated with the second multimedia resource, respectively. These may be, for example, data associated with a multimedia content file type, an accessing system type, an execution path associated with the accessing system, or the like. More preferably, the comparator compares the data associated with the first multimedia resource with the data associated with the second multimedia resource.

In a preferred embodiment, the comparator further comprises a matching component for matching the data associated with the first multimedia resource with the data associated with the second multimedia resource. For example, when the data associated with the first multimedia resource has the same format as the data associated with the second multimedia resource, a matching component is used. In another preferred embodiment, the comparator further comprises a mapping component for mapping the data associated with the first multimedia resource with the data associated with the second multimedia resource. For example, when the data associated with the first multimedia resource has a different format (e.g. different syntax, different language) to the data associated with the second multimedia resource, a mapping component is used.

Preferably, the system further comprises an analyzer for analyzing the first tag and the set of tags, in order to determine the data associated with the first multimedia resource and the data associated with the second multimedia resource. In one example, the analyzer is a parser. More preferably, the system further comprises a data generation component for generating the data associated with the first multimedia resource and the data associated with the second multimedia resource.

In a preferred embodiment, the data associated with the first multimedia resource and the data associated with the set of multimedia resources comprises data associated with ranking metrics and the at least one rule comprises at least one ranking rule. Advantageously, if more than one compatible multimedia resource is found, the ranking process aids in a determination of which compatible multimedia resource is to be executed.

Preferably, the system further comprises an interrupt component for interrupting the first multimedia resource, prior to the execution of the second multimedia resource. More preferably, the system further comprises an accessing component for accessing data associated with the availability of the second multimedia resource, prior to the determination of whether the second multimedia resource is to be executed.

In a preferred embodiment, the first multimedia resource and the set of multimedia resources are multimedia content files (e.g. audio files). In another preferred embodiment, the first multimedia resource and the set of multimedia resources are accessing systems (e.g. a CD player and a radio). In yet another preferred embodiment, the first multimedia resource and the set of multimedia resources are multimedia content files and associated accessing systems.

According to a second aspect, there is provided a method for executing a multimedia resource, for use in an environment having a first multimedia resource comprising an associated first tag, a set of multimedia resources comprising an associated set of tags, and an executing component for executing the first multimedia resource. The method comprises the steps of: in response to the first multimedia resource being executed, comparing a second tag of the set of tags with the first tag, in order to determine whether a second multimedia resource is compatible with the first multimedia resource, in response to the second resource being compatible with the first resource, determining in accordance with at least one rule, whether the second multimedia resource has a higher priority than the first multimedia resource; and in response to a determination that the second multimedia resource has the higher priority, controlling the executing component to execute the second multimedia resource.

According to a third aspect, there is provided a computer program comprising program code means adapted to perform all the steps of the method above, when the program is run on a computer.

Advantageously, when a resource is being executed, the present invention allows for other available resources to be assessed, in order to determine whether at least one of the other available resources should be executed instead.

It should be understood that the tags and rules described herein are for example purposes only and can be constructed in any other way. For example, a status for resource availability can be included in a tag associated with the resource.

It should be understood, that although the examples herein describe audio multimedia content, the present invention can be applied to other types of multimedia content, e.g., video.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENTS

Figure 1:
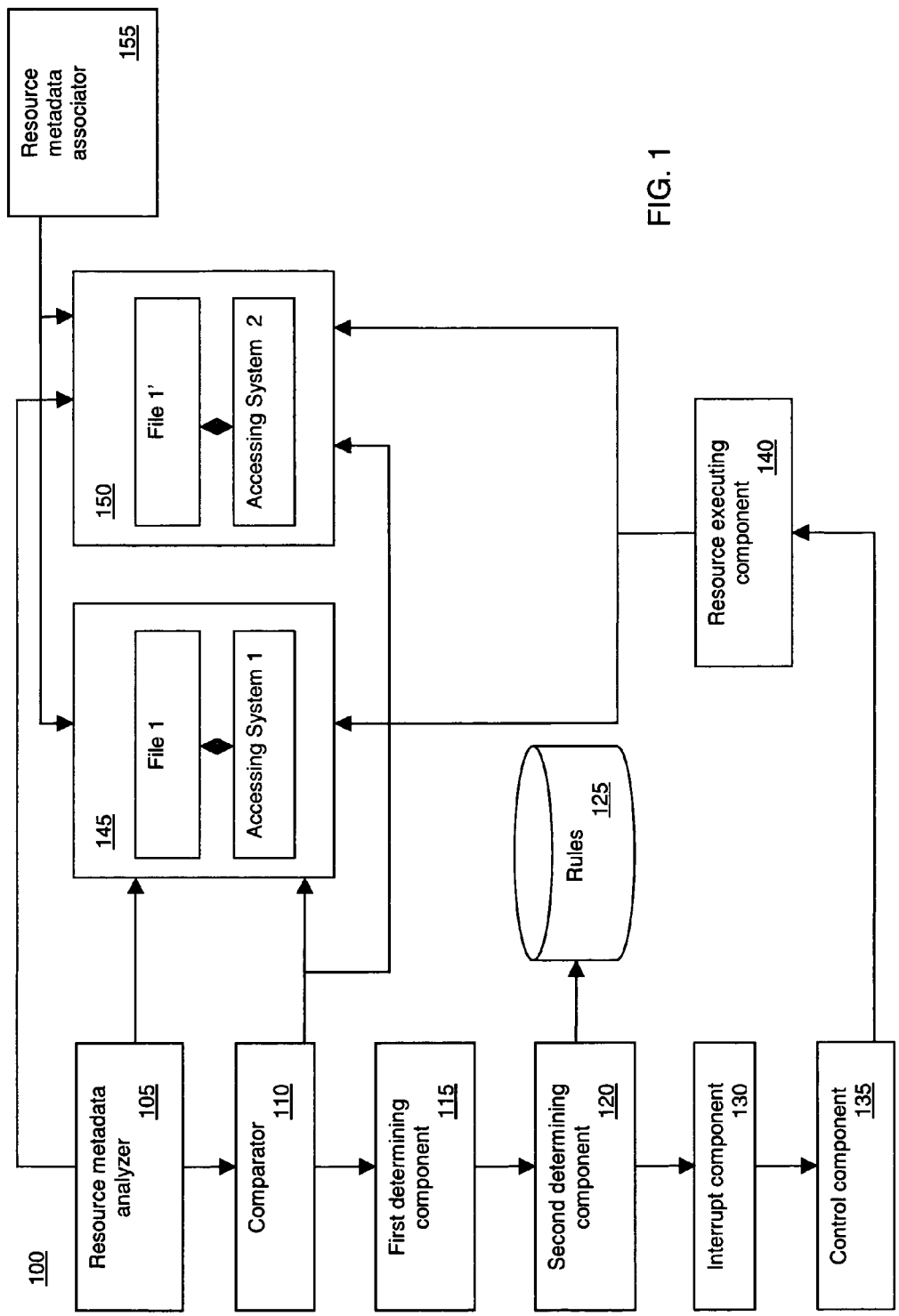
FIG. 1 is a schematic diagram of a data processing system in which the present invention may be implemented.

A system (100) according to the present invention is shown in FIG. 1. The system comprises two multimedia resources (145, 150), in which a first resource (145) is initially executed by a resource executing component (140). A resource comprises at least one component. In one example, a resource comprises a multimedia content file comprising data content (e.g. a broadcast signal comprising audio data; a music file comprising audio data etc.). In another example, a resource comprises an accessing system (i.e. a delivery system) for accessing the multimedia content file (e.g. a radio for accessing the broadcast signal; a compact disc (CD) player for accessing the music file, etc.). In yet another example, a resource comprises a multimedia content file and an accessing system.

In the example herein, each multimedia resource comprises a multimedia content file (File 1, File 1') (in this example, a broadcast signal and a music file, respectively) and an accessing system (Accessing system 1, Accessing system 2) (in this example, a radio and a CD player, respectively).

Preferably, the system (100) also comprises a resource metadata associator (155) for associating metadata about a resource, with that resource. In one embodiment, the metadata is stored locally with the resource. In another embodiment, the metadata is stored remotely (e.g. in a directory service). In yet another embodiment, metadata is associated with resources in a pre-processing phase, by a provider that provides the resources (e.g. wherein a provider is a multimedia content provider/broadcaster, an accessing system manufacturer etc.). It should be understood that metadata associated with a resource can be generated in a pre-processing phase, or following analysis of the resource itself.

In a first example, File 1 is assigned a tag comprising metadata, via the resource metadata associator (155). In the example tag below, a <type> field relates to the type of multimedia content file (e.g. audio, video, etc.) and also provides a means by which a corresponding accessing system to access the multimedia content file can be determined (see Accessing system 1 and 2 tags below). A <subtype> field relates to the format of the audio file (in this example, a broadcast signal). A <contentartist> field specifies the artist associated with File 1 (in this example, "John Smith"). A <contenttitle> field specifies the title associated with File 1 (in this example, "Pop Song"). Note that "content" in the tags specifies the fields associated with the data content of the multimedia content file.

File 1 tag:

<file-descriptor>
   <type> audio </type>
   <subtype> broadcast signal <subtype>
   <contentartist> John Smith </contentartist>
   <contenttitle> Pop Song </contenttitle>
</file-descriptor>

In this example, File 1' is also assigned a tag comprising metadata, via the resource metadata associator (155). The tag comprises a <type> field as described above. A <subtype> field relates to the format of the audio file (in this example, a CD music file). The <contentartist> field specifies the artist associated with File 1' (in this example, "Smith John"). The <contenttitle> field specifies the title associated with File 1' (in this example, "Pop Song"):

File 1' tag:

<file-descriptor>
   <type> audio </type>
   <subtype> cd music file <subtype>
   <contentartist> Smith John</contentartist>
   <contenttitle> Pop Song </contenttitle>
</file-descriptor>

In this example, Accessing system 1 is assigned a tag comprising metadata, via the resource metadata associator (155). A <type> field relates to the type of multimedia content files that Accessing system 1 can access and this field corresponds to the <type> field in the tags associated with File 1 and File 1'. A <subtype> field relates to the format of the audio file that can be accessed and this field corresponds to the <subtype> field in the tags associated with File 1 and File 1'. A <name> field specifies the name of Accessing system 1 (in this example, "radio"). An <execute> field specifies the execution path that is associated with the execution of Accessing system 1. It should be understood that execution of an accessing system can occur locally within the system, or remotely (e.g. over the Internet):

Accessing System 1 tag:

<accessing system-descriptor>
   <type> audio </type>
   <subtype> broadcast signal <subtype>
   <name> radio </name>
   <execute> Files\radio.exe </execute>
</accessing system-descriptor>

In this example, Accessing system 2 is also assigned a tag comprising metadata, via the resource metadata associator (155). The <type> field relates to the type of multimedia content files that Accessing system 2 can access. The <subtype> field relates to the format of the audio file that can be accessed. The <name> field specifies the name of Accessing system 2 (in this example, "cdplayer"). The <execute> field specifies the execution path that is associated with the execution of Accessing system 2:

---
Accessing System 2 tag:

<accessing system-descriptor>
   <type> audio </type>
   <subtype> cd music file; mp3 music file <subtype>
   <name> cdplayer </name>
   <execute> Files\cdplayer.exe </execute>
</accessing system-descriptor>

---

The system (100) also comprises a resource metadata analyzer (105) for determining the tags associated with the resources (145, 150). In one embodiment, this determination is executed in a pre-processing stage. In another embodiment, this determination is executed in response to the first resource (145) being executed; for example, when Accessing system 1 accesses File 1, Accessing system 1 sends to the resource metadata analyzer (105) the tags associated with File 1 and Accessing system 1. Optionally, data associated with system processes that are running during the execution of the first resource (145) can also be sent (e.g. process identifier, memory usage etc.). In yet another embodiment, the resource metadata analyzer (105) communicates with a resource provider in order to determine the tags.

In one embodiment, the determination is executed by a parsing process, which parses each tag. In another embodiment, the determination is executed by look ups of a registry comprising registry entries of the resources (e.g. wherein a registry entry comprises data regarding resource name, associated resource tags, resource availability (e.g. state=available; state=unavailable) etc.).

The system (100) also comprises a comparator (110), to which is input the determined tag(s) associated with the first resource (145) (described herein as "first tag(s)") and the determined tag(s) associated with the second resource (150) (described herein as "second tag(s)"). The comparator (110) compares the first tag(s) with the second tag(s) and passes the results of this comparison to a first determining component (115). The first determining component (115) uses the results of a comparison in which the second tag(s) corresponds to the first tag(s) and determines that the second resource is compatible with the first resource.

The system (100) also comprises a second determining component (120), which in response to a determination that the second resource is compatible with the first resource, accesses a set of data (in this example, a set of rules (125)) in order to determine whether the second resource has a priority over the first resource and therefore, whether the second resource should be executed. A control component (135) is responsive to a determination that the second resource has priority, and controls the resource executing component (140) to execute the second resource. In one embodiment, the control component (135) is a control signal from the second determining component (120). Preferably, an interrupt component (130) interrupts the first resource before the second resource is executed.

Figure 2:
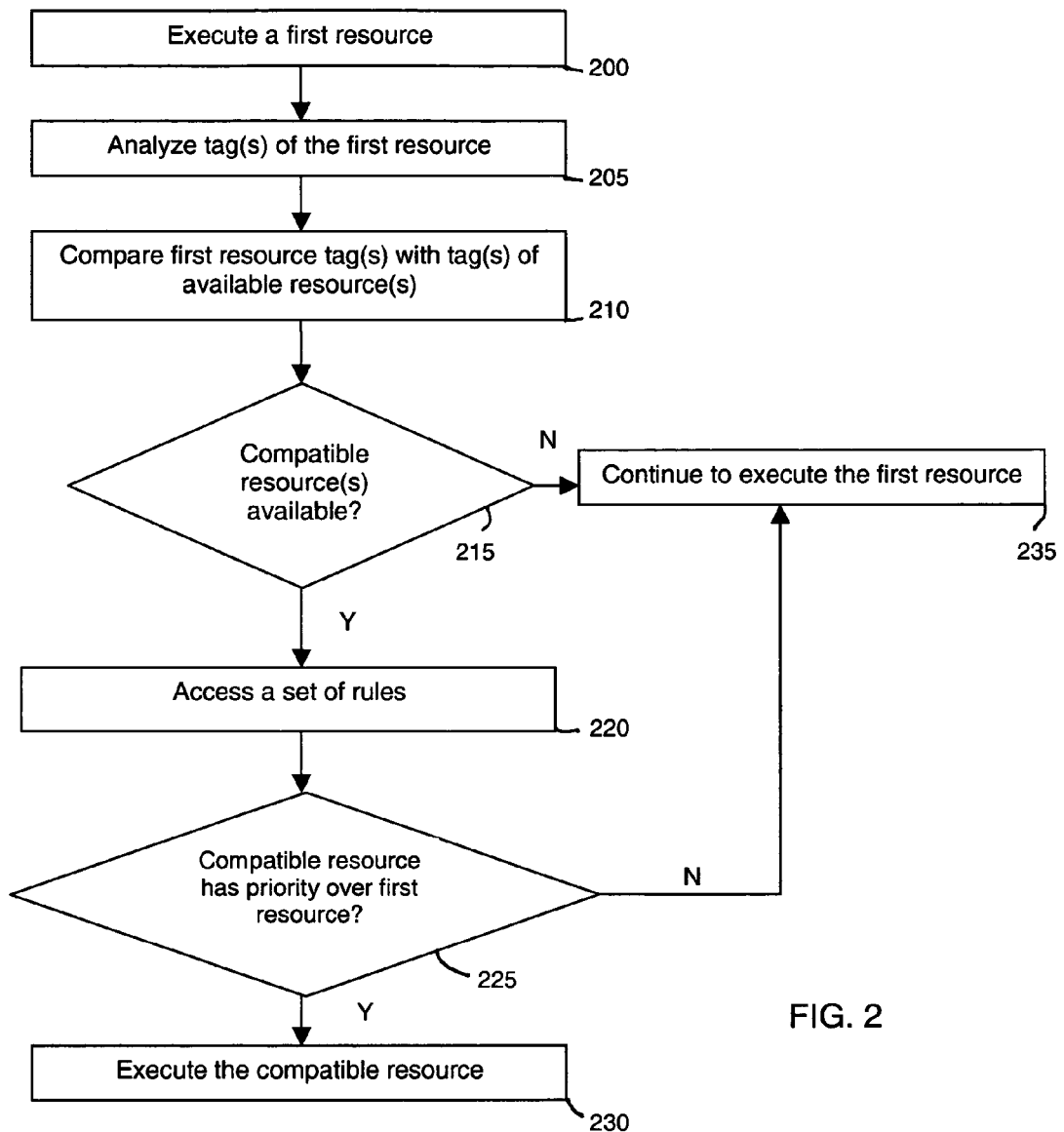
FIG. 2 is a flow chart showing the operational steps involved in a resource execution process.

A process according to a preferred embodiment will now be described with reference to FIG. 1 and FIG. 2. In this example, the system and process of the preferred embodiment are executed in a vehicle (e.g., a car). Preferably, in a pre-processing stage, the resources are associated with tags (in this case, each component (i.e. File 1, Accessing system 1) of a first resource (145) and each component (i.e. File 1', Accessing system 2) of a second resource (150) are associated with the tags in the examples above).

In step 200, the first resource (145) (i.e. File 1 and Accessing system 1) is initially executed by the resource executing component (140). In this example, a broadcast signal (File 1) is broadcast via a radio (Accessing system 1). Next, the resource (145) is detected by the resource metadata analyzer (105), causing it to perform analysis (step 205) in order to determine the first tags associated with the resource and then to determine the metadata in the tags. It should be understood that the resource metadata analyzer (105) also determines the tag(s) associated with all other available resources in the vehicle. In this example, the other available resource is a second resource (150) comprising a set of music files accessible via an in-vehicle accessing system (i.e. CD player). In another example, the other available resource is a resource comprising set of music files accessible via an in-vehicle accessing system (e.g. an mp3 player).

Once analysis in step 205 has been completed, the resource metadata analyzer (105) passes the results of its analysis to the comparator (110). The comparator (110) compares (step 210) the metadata in the tags (i.e. first tags) associated with the first resource with the metadata in the tags (i.e. second tags) associated with the second resource. The comparison is used by the first determining component (115) in order to determine (step 215) whether the second resource is compatible with the first resource.

In order to be compatible, during the comparison, at least some of the metadata in the tags associated with the first resource matches or corresponds to at least some of the metadata in the tags associated with the second resource.

In this example, since the resources comprise a multimedia content file and an accessing system, the fields associated with the data content of the multimedia content file must match or correspond. This is because although a second resource is executed, the data content of the multimedia file of the second resource is the same as the data content of the multimedia file of the first resource. For example, even if the second resource is executed (i.e. a CD music file of the song "Pop Song" is accessed on a CD player) instead of the first resource being executed (i.e. a broadcast signal of the song "Pop Song" is accessed via a radio), the data content of the multimedia file of the second resource is still the same as the data content of the multimedia file of the first resource. Thus, the effect to the user is that the same song is re-played.

In another example, if the resources both comprise multimedia content files (such that either multimedia content file can be accessed by a single accessing system), the fields associated with the data content of the multimedia content files must match or correspond. Thus, the effect to the user is that the same song is re-played. In yet another example, if the resources both comprise accessing systems (such that a single multimedia content file can be accessed by both of the accessing systems), the fields denoting the type and/or subtype of multimedia content file that an accessing system can access must match or correspond. This is because both accessing systems need to be able to access the single multimedia content file, having a certain type. Again, the effect to the user is that the same song is re-played.

If the format of the tags is the same, the comparator (110) executes a matching comparison process. If the format of the tags is not the same (e.g. different syntax, different language etc.), the comparator (110) executes a mapping process and then a comparison process (e.g. in the tags for File 1 and File 1', because the order of the metadata in the <contentartist> fields is different, the <contentartist> field of the tag for File 1 (comprising metadata John Smith) is mapped to the <contentartist> field of the tag for File 1' (comprising metadata Smith John) and then the tags are compared) and found to correspond.

In this example, the <contenttitle> field in the tag for File 1 matches the <contenttitle> field in the tag for File 1'. Also, the <contentartist> field in the tag for File 1 corresponds to the <contentartist> field in the tag for File 1'.

Thus, since at least some of the metadata in the first tags matches or corresponds to at least some of the metadata in the second tags, using the results of this comparison, the first determining component (115) determines that components in the second resource (150) are compatible with components in the first resource (145) (positive result to step 215).

If the second resource (150) is not compatible with the first resource (145) (in this example, if the <contenttitle> field of File 1 comprises metadata "Pop Song" and the <contenttitle> field of File 1' comprises metadata "Rock Song"), the process passes to step 235, wherein the first resource (145) continues to execute. It should be understood that if there are other available resources, checks for compatibility are executed against the other available resources.

Referring back to the positive result from step 215, the process passes to step 220, wherein the second determining component (120) (responsive to the first determining component (115) determining that the second resource is compatible with the first resource) accesses a set of data, in this example, a set of rules (125), in order to determine (step 225) whether a compatible resource has priority over the first resource and therefore, whether the compatible resource is to be executed. A rule in this example is shown below:

```
<rule>
    if   <contentartist> John Smith </contentartist>
         <contenttitle> Pop Song </contenttitle>
         then
    do   <execute> = Files\cdplayer.exe
</rule>
```

In this example rule, it is specified that if the multimedia content file comprises data content of a song "Pop Song" by John Smith, then the CD player should be executed in order to access this song. In this example, since the song "Pop Song" by John Smith is being accessed via a radio, the rule causes the control component (135) to control the resource executing component (140) to execute (step 230) the second resource. Thus, the result is that the song "Pop Song" by John Smith (i.e. CD music file, File 1') is accessed via the CD player. Advantageously, the present invention allows the song to be accessed optimally, because the CD player and CD music file have a better associated output quality than radio and do not have the problems of a broadcast signal which may not be available if the vehicle travels out of range or the like.

Preferably, the second determining component (120) also accesses details regarding availability of the second resource (e.g., via a look up of a registry), before the control component (135) controls the resource executing component (140) to execute the second resource. It should also be understood that if no appropriate rule exists, so that (even if a compatible resource exists) a compatible resource is not to be executed, the process passes to step 235, wherein the first resource (145) continues to execute.

Alternatively, in response to a positive result to step 225, a user is presented with an option of executing a compatible resource (e.g. via an audio prompt, via a textual prompt etc.).

In the example described above, each of the resources comprises a multimedia content file and an accessing system. In another example, the resources each comprise an accessing system, so that initially a first resource is executed, that is a first accessing system (e.g. a networked media player) is executed, wherein the first accessing system accesses a multimedia content file (e.g. an mp3 music file). If a compatible resource is found and if in accordance with a rule, a second resource is to be executed, a second resource is executed, that is a second accessing system (e.g. an mp3 player) is executed, wherein the second accessing system accesses the same multimedia content file (i.e. the mp3 music file).

In yet another example, each of the resources comprises a multimedia content file, so that initially a first resource is executed, that is, a first multimedia content file (e.g., a CD music file) is accessed by an accessing system (e.g., a CD player). If a compatible resource is found and if in accordance with a rule, a second resource is to be executed, a second resource is executed, that is a second multimedia content file (e.g., an mp3 music file) is executed and is accessed by the same accessing system (i.e., the CD player). It should be understood that if a second multimedia content file is executed, the data content of the second multimedia content file corresponds to or is the same as the data content of the first multimedia content file.

In a second embodiment, at least some of the tags associated with a resource comprise metrics that can be used in a ranking process. The rules comprise ranking rules and the second determining component (120) ranks resources in accordance with one or more ranking rules, such that the outcome of the ranking process aids in the determination of which compatible resource has priority over the first resource.

In an example, three compatible accessing systems have been found in step 215. A tag associated with Accessing system 1 is shown below, wherein a quality metric (i.e. <metric name> quality </metric name>) represents the quality at which a multimedia content file is output and wherein an associated <value> field specifies the value associated with the quality metric. A cost metric (i.e. <metric name> cost </metric name>) represents the monetary cost involved with executing an accessing system and wherein an associated <value> field specifies the value associated with the cost metric.

In this example, a value for the <value> field of 1 represents "High", 2 represents "Medium" and 3 represents "Low". Thus, the metrics in the tag below define a radio as having an associated low quality output and a low cost.

```
<accessing system-descriptor>
    <name> radio </name>
    <type> audio </type>
    <execute> Files\radio.exe </execute>
    <metric name> quality </metric name>
        <value> 3 </value>
    <metric name> cost </metric name>
        <value> 3 </value>
</accessing system-descriptor>
```

A tag associated with Accessing system 2 is shown below. The metrics in the tag below define a CD player as having an associated high quality output and a low cost.

```
<accessing system-descriptor>
    <name> cdplayer </name>
    <type> audio </type>
    <execute> Files\cdplayer.exe </execute>
    <metric name> quality </metric name>
        <value> 1 </value>
    <metric name> cost </metric name>
        <value> 3 </value>
</accessing system-descriptor>
```

A tag associated with an Accessing system 3 is shown below. The metrics in the tag below define an mp3 player as having an associated medium quality output and a low cost.

```
<accessing system-descriptor>
    <name> mp3player </name>
    <type> audio </type>
    <execute> Files\mp3player.exe </execute>
    <metric name> quality </metric name>
        <value> 2 </value>
    <metric name> cost </metric name>
        <value> 3 </value>
</accessing system-descriptor>
```

A ranking rule in this example is shown below, wherein a sort of the quality metric occurs, starting from 1 and then descending in quality (i.e. so that the accessing system with the output of the highest quality is ranked first) and wherein a sort of the cost metric occurs, starting from 3 and then ascending in cost (i.e. so that the accessing system with the lowest associated cost is ranked first):

```
<rule>
    <sort order = "1"; metric name = quality; algorithm = descending>
    <sort order = "3"; metric name = cost; algorithm = ascending>
</rule>
```

Thus, once compatible resources have been found in step 215, in step 220 the ranking rules are accessed and if in accordance with a rule in step 225, the highest ranked resource is to be executed, the resource executing component (140) executes (step 230) the highest ranked resource. Thus, when the second determining component (120) assesses the resource, for the quality metric, the CD player is ranked first, the mp3 player is ranked second and the radio is ranked third. For the cost metric, the radio, the CD player and the mp3 player are ranked jointly first. Thus, since the cost metric for the accessing system does not provide for differentiation between the accessing systems and the quality metric does provide for differentiation between the accessing systems, the second determining component (120) uses the quality metric to determine that the CD player should be executed. Preferably, if the ranking process does not produce results that allow for differentiation between the accessing systems, the user is presented with one or more options of resources that can be executed.

We claim:

1. A system for executing a multimedia resource in an environment having a first multimedia resource comprising an associated first tag, a set of multimedia resources comprising an associated set of tags, and an executing component for executing a multimedia resource; the system comprising:
   a comparator, responsive to the first multimedia resource being executed, for comparing a second tag of the set of tags with the first tag in order to determine whether a second multimedia resource associated with the second tag is compatible with the first multimedia resource;
   a determining component, responsive to the second multimedia resource being compatible with the first multimedia resource, for determining in accordance with at least one rule whether the second multimedia resource has a higher priority than the first multimedia resource;
   an interrupt component that interrupts the first resource before the second resource is executed; and
   a control component, responsive to a determination that the second multimedia resource has higher priority, for controlling the executing component to execute the second multimedia resource.

2. A system as claimed in claim 1, wherein the first tag and the set of tags comprise data associated with the first multimedia resource and data associated with the set of multimedia resources, respectively.

3. A system as claimed in claim 2, wherein the comparator compares the data associated with the first multimedia resource with data from the second tag associated with the second multimedia resource.

4. A system as claimed in claim 3, wherein the comparator further comprises a matching component for matching the data associated with the first multimedia resource with the data associated with the second multimedia resource.

5. A system as claimed in claim 3, wherein the comparator further comprises a mapping component for mapping the data associated with the first multimedia resource with the data associated with the second multimedia resource.

6. A system as claimed in claim 2, further comprising an analyzer for analyzing the first tag and the set of tags in order to determine the data associated with the first multimedia resource and the data associated with the second multimedia resource.

7. A system as claimed in claim 2, further comprising a data generation component for generating the data associated with the first multimedia resource and data associated with the second multimedia resource included in the second tag.

8. A system as claimed in claim 2, wherein the data associated with the first multimedia resource and the data associated with the set of multimedia resources comprises data associated with ranking metrics and the at least one rule comprises at least one ranking rule.

9. A system as claimed in claim 1, further comprising an interrupt component for interrupting the first multimedia resource prior to the execution of the second multimedia resource.

10. A system as claimed in claim 1, further comprising an accessing component for accessing data associated with availability of the second multimedia resource prior to the control component attempting to execute the second multimedia resource.

11. A system as claimed in claim 1, wherein the first multimedia resource and the set of multimedia resources are multimedia content files.

12. A system as claimed in claim 1, wherein the first multimedia resource and the set of multimedia resources are accessing systems.

13. A system as claimed in claim 1, wherein the first multimedia resource and the set of multimedia resources are multimedia content files and associated accessing systems.

14. A method for executing a multimedia resource in a computer-based multimedia device environment having a first multimedia resource comprising an associated first tag, a set of multimedia resources comprising an associated set of tags, and executing component circuitry configured to for executing execute a multimedia resource; the method comprising the steps of:
- in response to the first multimedia resource being executed, comparing in said computer-based multimedia device a second tag of the set of tags with the first tag in order to determine whether a second multimedia resource associated with the second tag is compatible with the first multimedia resource;
- in response to the second multimedia resource being compatible with the first multimedia resource, determining in said computer-based multimedia device in accordance with at least one rule whether the second multimedia resource has a higher priority than the first multimedia resource;
- an interrupt component that interrupts the first resource before the second resource is executed; and
- in response to a determination that the second multimedia resource has the higher priority, controlling the executing component to execute the second multimedia resource.

15. A method as claimed in claim 14, wherein the first tag and the set of tags comprise data associated with the first multimedia resource and data associated with the set of multimedia resources, respectively.

16. A method as claimed in claim 15, wherein the comparing step further comprises the step of comparing the data associated with the first multimedia resource with data from the second tag associated with the second multimedia resource.

17. A method as claimed in claim 16, wherein the comparing step further comprises the step of matching the data associated with the first multimedia resource with data from the second tag associated with the second multimedia resource.

18. A method as claimed in claim 16, wherein the comparing step further comprises the step of mapping the data associated with the first multimedia resource with data from the second tag associated with the second multimedia resource.

19. A method as claimed in claim 15, further comprising the step of analyzing the first tag and the set of tags in order to determine the data associated with the first multimedia resource and data associated with the second resource.

20. A method as claimed in claim 15, further comprising the step of generating the data associated with the first multimedia resource and data associated with the second multimedia resource included in the second tag.

21. A method as claimed in claim 15, wherein the data associated with the first multimedia resource and the data associated with the set of multimedia resources comprises data associated with ranking metrics and the at least one rule comprises at least one ranking rule.

22. A method as claimed in claim 14, further comprising the step of interrupting the first multimedia resource prior to the execution of the second multimedia resource.

23. A method as claimed in claim 14, further comprising the step of accessing data associated with the availability of the second multimedia resource prior to a determination of whether the second multimedia resource is to be executed.

24. A method as claimed in claim 14, wherein the first multimedia resource and the set of multimedia resources are multimedia content files.

25. A method as claimed in claim 14, wherein the first multimedia resource and the set of multimedia resources are accessing systems.

26. A method as claimed in claim 14, wherein the first multimedia resource and the set of multimedia resources are multimedia content files and associated accessing systems.

27. A computer program product for executing a multimedia resource in an environment having a first multimedia resource comprising an associated first tag, a set of multimedia resources comprising an associated set of tags, and an executing component for selectively executing a multimedia resource; the computer program product comprising a computer readable medium having computer readable program code embedded therein, the computer readable program code comprising:
- computer readable program code configured to, in response to the first multimedia resource being executed, compare a second tag of the set of tags with the first tag in order to determine whether a second multimedia resource associated with the second tag is compatible with the first multimedia resource;
- computer readable program code configured to, in response to the second multimedia resource being compatible with the first multimedia resource, determine in accordance with at least one rule whether the second multimedia resource has a higher priority than the first multimedia resource;
- computer readable program code configured for an interrupt component that interrupts the first resource before the second resource is executed; and
- computer readable program code configured to, in response to a determination that the second multimedia resource has the higher priority, control the executing component to execute the second multimedia resource.

* * * * *